(12) United States Patent
Yao et al.

(10) Patent No.: US 6,753,192 B1
(45) Date of Patent: Jun. 22, 2004

(54) PREPARATION OF ULTRATHIN MAGNETIC LAYER ON SEMICONDUCTORS

(75) Inventors: Yeong-Der Yao, Taipei (TW); Jyh-Shen Tsay, Taipei (TW); Heng-Yun Nieh, Taipei (TW); Cheng-Shiu Yang, Taipei (TW)

(73) Assignee: Academia Sinica, Taipei (TW)

( * ) Notice: Subject to any disclaimer, the term of this patent is extended or adjusted under 35 U.S.C. 154(b) by 0 days.

(21) Appl. No.: 10/368,565

(22) Filed: Feb. 20, 2003

(51) Int. Cl.$^7$ .............................................. H01L 21/00
(52) U.S. Cl. ........................... 438/3; 438/381; 257/421
(58) Field of Search ........................... 438/3, 381, 650; 257/421, 528

(56) References Cited

U.S. PATENT DOCUMENTS

| | | | | |
|---|---|---|---|---|
| 5,712,028 A | * | 1/1998 | Seki et al. | ................... 428/216 |
| 6,414,808 B1 | * | 7/2002 | Allenspach et al. | ........... 360/55 |
| 6,548,114 B2 | * | 4/2003 | Mao et al. | ............... 427/255.7 |
| 2002/0058148 A1 | * | 5/2002 | Den | ............................ 428/457 |
| 2003/0042562 A1 | * | 3/2003 | Giebeler et al. | ............. 257/421 |

* cited by examiner

*Primary Examiner*—Tuan H. Nguyen
(74) *Attorney, Agent, or Firm*—Bacon & Thomas, PLLC

(57) ABSTRACT

According to the method for preparation of ultrathin magnetic layer on semiconductor of this invention, a non-ferromagnetic metal buffer layer thinner than 40 ML is formed on the semiconductor substrate on which the magnetic layer is to be prepared. The thickness of the non-ferromagnetic metal buffer layer may be 0.5–9 ML, preferably 1–8 ML, most preferably 1.5–6 ML. Thereafter, the magnetic layer is formed on said non-ferromagnetic metal buffer layer. The thickness of the magnetic layer so prepared may be less than 40 ML, close to the limitation of ultrathin. Material for the non-ferromagnetic metal buffer layer is preferably a metal or metal alloy that is immiscible with the magnetic layer when the magnetic layer is formed on the buffer layer. In the embodiments of the present invention, the non-ferromagnetic metal is silver, while material of the magnetic layer is cobalt. This invention also discloses the magnetic structure so prepared.

9 Claims, 9 Drawing Sheets

PREPARATION OF ULTRATHIN MAGNETIC LAYER ON SEMICONDUCTORS

FIELD OF THE INVENTION

The present invention relates to a method for preparation of ultrathin magnetic layer on semiconductors and the magnetic structure so prepared, especially to a method for preparing ultrathin magnetic layer with fixed-coercive force on semiconductor and the magnetic structure so prepared.

BACKGROUND OF THE INVENTION

The research of metal/semiconductor interfaces has been intensively made by scientists and the industry in the past decades. Within this broad field, forming a magnetic layer on semiconductor substance in a nanometer scale is a newly developed technology. As the standards of electronic components and data recording media have reached a level such that magnetic structure has to be fabricated under the scale of nanometer, the thickness of magnetic layer must be reduced to several to tens of angstrom, whereby the size of devices may be reduced and unit density may be increased. Under such a scale, the nanometer-scaled magnetic structure so prepared must provide desired magnetic properties. As a result, preparing a nanometer-sized magnetic structure with desired magnetic properties has become a task of scientists and engineers ii this field. In addition, to reduce the thickness of magnetic layer on magnetic structures to the limitation of ultrathin has been an aim of researchers.

U.S. Pat. No. 6,317,045 disclosed a physical vapor deposition device for forming a metallic layer o a semiconductor wafer. In this invention, the PVD device provides an electric field generator for forming a vertical electric field to guide the metallic ions toward the wafer chuck at a slant angle. As a result, the deposition efficiency of magnetic layer at the sidewalls of the holes in the semiconductor wafer may be improved.

Due to the intensive research on magnetic films, the basic element of magnetic structures, it has been found that the magnetic properties of a magnetic film will be significantly influenced, if an interface layer is added between the magnetic film and its substrate. It has also been realized that variations in physical properties of the magnetic film, when the thickness of tile magnetic film is "ultrathin", will become decisive factors for the magnetic properties of the magnetic structure. In order to prepare an ultrathin magnetic layer on a semiconductor substrate, it is necessary to overcome or make good use of these factors.

OBJECTIVES OF THE INVENTION

One objective of this invention is to provide a novel method of preparation of ultrathin magnetic layer on semiconductors.

Another objective of this invention is to provide a method for preparation of ultrathin magnetic layer on semiconductors with fixed-coercive force.

Another objective of this invention is to provide a method of preparing a magnetic layer on semiconductor substrate with the help of a non-ferromagnetic metal buffer layer.

Another objective of this invention is to provide a magnetic structure prepared from the above methods.

SUMMARY OF THE INVENTION

According to the method for preparation of ultrathin magnetic layer on semiconductor or this invention, a non-ferromagnetic metal buffer layer thinner than 40 ML is formed on the semiconductor substrate on which the magnetic layer is to be prepared. According to experiments, the thickness of the non-ferromagnetic metal buffer layer may be 0.5–9 ML, preferably 1–8 ML, most preferably 1.5–6 ML. Thereafter, the magnetic layer is formed on said non-ferromagnetic metal buffer layer. The thickness of the magnetic layer so prepared may be less than 40 ML, close to the limitation of ultrathin. Material for the non-ferromagnetic metal buffer layer is preferably a metal or metal alloy that is immiscible with the magnetic layer when the magnetic layer is formed on the buffer layer. In the embodiments of the present invention, the non-ferromagnetic metal is silver, while material of the magnetic layer is cobalt. This invention also discloses the magnetic structure so prepared.

These and other objectives and advantages of this invention may be clearly understood from the detailed description by referring to the following drawings.

DETAILED DESCRIPTION OF THE INVENTION

It has been found that, when the thickness of a magnetic structure prepared on semiconductor substrate reaches the level of ultrathin, the diffusion or combination of the magnetic material and the semiconductor substrate will significantly influence the magnetic properties of the magnetic layer. For example, if a Co magnetic layer is grown on a Ge substrate directly, when the thickness of the Co layer is very thin, a CoGe compound layer, a non-ferromagnetic layer, is formed. As a result, the magnetic properties of cobalt will be damaged such that the structure so prepared may not function as a magnetic structure.

Although it is not intended to limit the scope of this invention, it is found that, if a buffer layer made by a non-ferromagnetic metal material, which is immiscible to the magnetic material, is formed on the semiconductor substrate before the magnetic material layer is grown, it is possible to prepare an ultrathin magnetic layer on the semiconductor substrate with fixed-coercive force.

Figure 1:
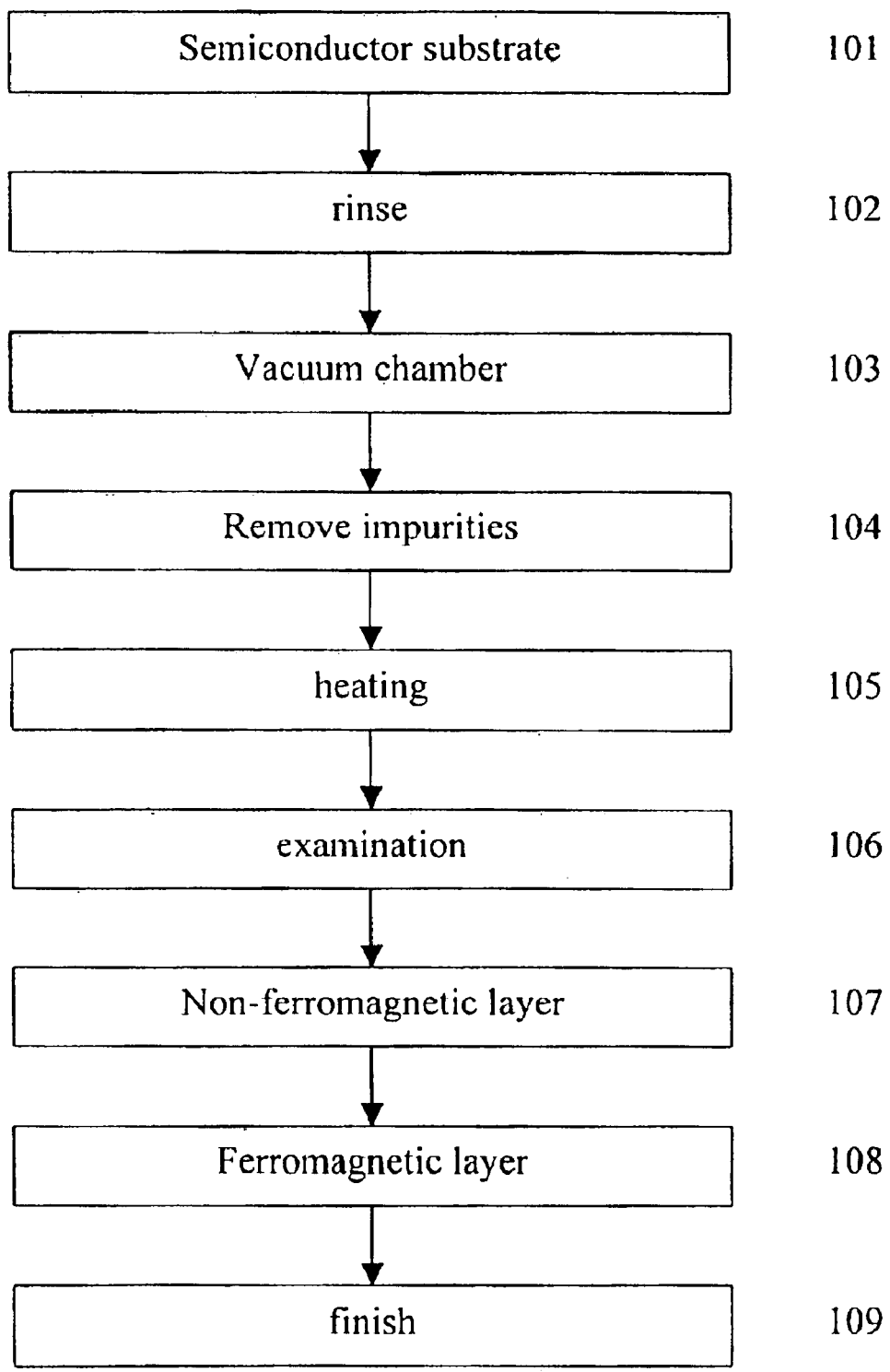
FIG. 1 illustrates the flowchart for the preparation of ultrathin magnetic layer on semiconductors of this invention.

The method for preparation of ultrathin magnetic layer on semiconductors of this invention will be described in the followings by illustrating to its embodiments. FIG. 1 shows the flowchart for the preparation of ultrathin magnetic layer on semiconductors of this invention.

As shown in FIG. 1, in the preparation of an ultrathin magnetic layer on a semiconductor substrate according to the invented method, at 101 a semiconductor substrate is first prepared. In this example, The material of the semiconductor substrate is germanium (Ge). The Ge material is processed with necessary steps, including epitaxy, reline etc., to obtain a semiconductor substrate. The preparation of the Ge semiconductor is a well-known art to those skilled in the art. Detailed description there of is thus omitted. Of course, other material that is suited to prepare a semiconductor substrate may be used in this invention. Suited materials include silicon, Ge, GaAs and InT.

At 102, the substrate is rinsed with ethanol or acetone and/or other rinses. Rinse the substrate with ultrasonic waves is recommended. At 103 the rinsed substrate is fastened at the sample holder in a vacuum chamber. In this example, the pressure of the vacuum chamber is preferably $3 \times 10^{-10}$ Torr, while the pressure of the vacuum chamber may be decided case by case.

At 104 the surface of the semiconductor substrate is cleaned to remove impurities. In this example, the surface of the semiconductor substrate is cleaned by an Ar+ ion bombard. Observe the surface with an AES (Auger electron spectroscopy) to ensure that the surface of the substrate is clean. At 105 the substrate is annealed by direct resistance heating. Check the substrate at 106 to make sure that the surface of the semiconductor substrate is perfectly reconstructed.

Thereafter, at 107, a non-ferromagnetic layer is formed on the surface of the semiconductor substrate. The non-ferromagnetic layer may be made of any material that is immiscible to the magnetic material to form the magnetic layer under the environment wherein the magnetic layer is to be prepared. Non-ferromagnetic metals are suited in this invention. In this example the non-ferromagnetic layer is a silver (Ag) layer. The non-ferromagnetic layer may be prepared by chemical vapor deposition, physical vapor deposition, sputter, plating or chemical vapor deposition. If the physical vapor deposition is used, the non-ferromagnetic layer may be deposited on the semiconductor substrate with a resistance bombard electronic gun. File thickness of the non-ferromagnetic layer is preferably ultrathin. In general, the thickness of the non-ferromagnetic layer may be 0.5–9 ML, preferably 1–8 ML, most preferably 1.5–6 ML.

At 108 a magnetic layer is formed on the non-ferromagnetic layer. Material of the magnetic layer may be any magnetic material that provides desired magnetic properties under an ultrathin thickness. In this example, cobalt (Co) is selected as material of the magnetic layer. However, other materials such as Fe, Ni, CoPt, FePt, FeMn alloy are also applicable in this invention, depending on the application. As to the technology in forming the magnetic layer, any method to form a magnetic layer on a non-ferromagnetic layer is applicable in this invention. For example, coating a magnetic material by heating the source on the surface of the non-ferromagnetic layer may be suitable. Of course, other methods such as plating, CVD are also applicable temperature of the coating process may be 200K to 300K, or any temperature below or above that range. Thickness of the magnetic layer may be 1–50 ML, preferably 3–40 ML, most preferably 5–30 ML.

At 109, the magnetic structure so prepared is examined and the magnetic properties are checked. The preparation of the ultrathin semiconductor-magnetic structure is thus completed.

The magnetic properties of the magnetic structure as prepared is verified by in-situ surface magneto-optic Kerr effect (SMOKE) technique in an ultra-high vacuum chamber. Due to the ultra-thinness of the films of the magnetic structure, the samples are not of three dimension like bulks but of two dimension. The main magnetism come from this two-dimensional magnetic layer. Therefore, the MOKE of the two-dimensional surface may be called SMOKE. The thickness of the samples are measured by the atomic concentration, which may be measured oil the surface of the samples with AES.

Figure 2:
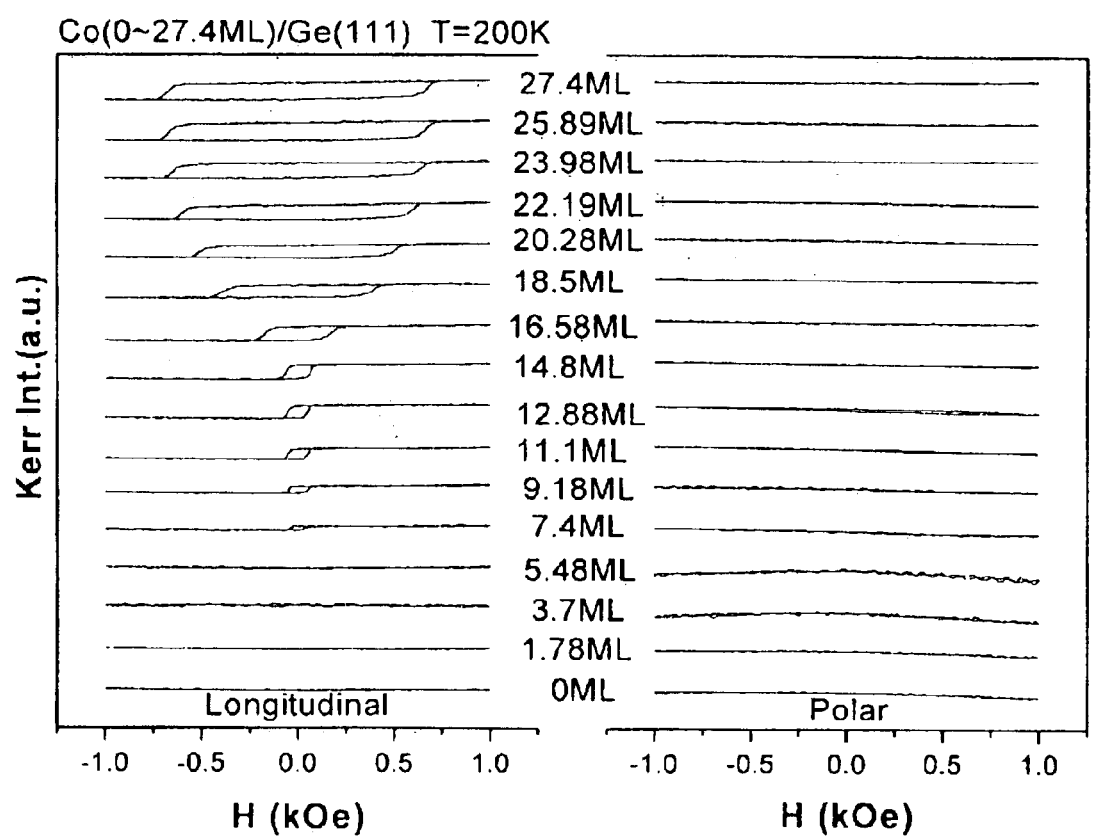
FIG. 2 shows the SMOKE signal ratio of ultrathin Co layer formed on Ge substrate at 200 K°, when the thickness of the Co layer varies from 0 to 20 ML.
Figure 3:
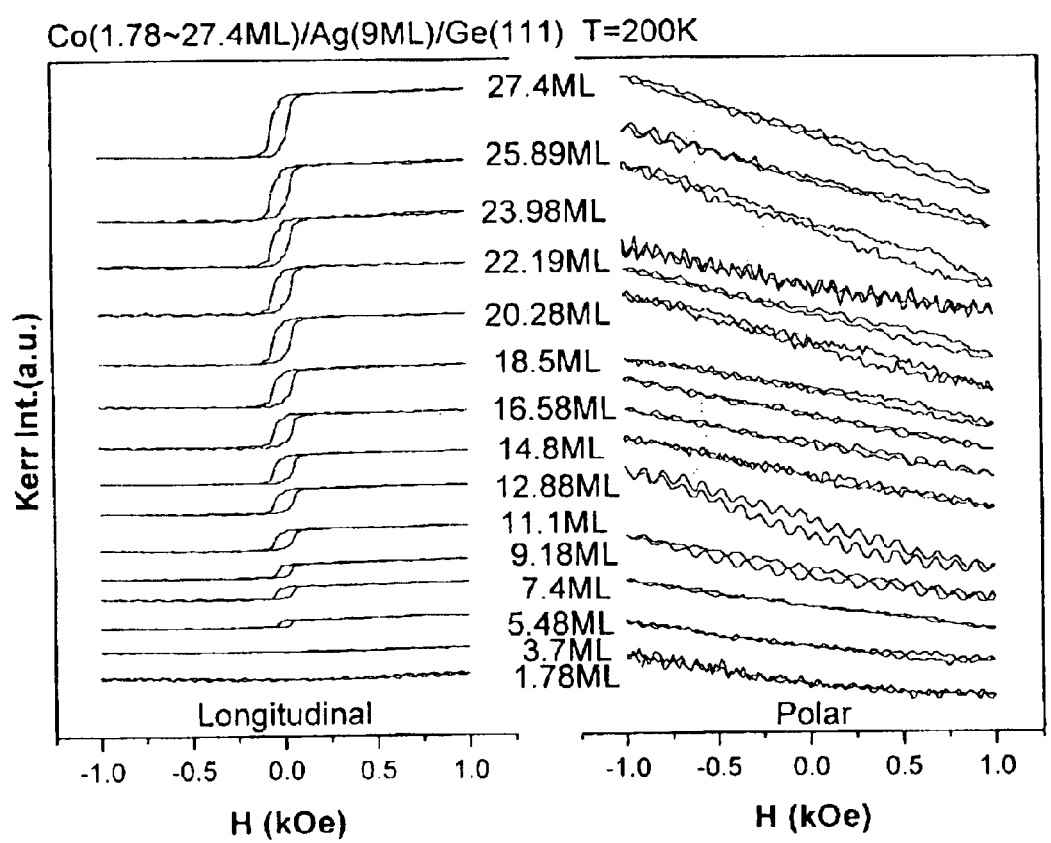
FIG. 3 shows the SMOKE signal ratio of ultrathin Co layer formed on a 9 ML Ag buffer layer on Ge substrate, when the thickness of the Co layer varies from 1.3 to 20 ML.

In order to prove the effects of this invention, samples with Ce semiconductor substrate, Ag non-ferromagnetic metal buffer layer and Co magnetic layer are prepared. The influences of the Ag buffer layer to the ultrathin magnetic structure is examined. Comparison samples are prepared by growing a Co film on Ge (111) substrate at 200K directly. The Kerr signal ratio is measured. FIG. 2 shows the SMOKE signal ratio of ultrathin Co layer formed on Ge substrate at 200K, with the thickness of the Co layer varying from 0 to 20 ML, Samples prepared according to this invention are prepared by first forming an Ag layer of 3, 6 and 9 ML in thickness and then growing a Co layer on the Ag layer at 200K. The Kerr magnetic ratio is examined. FIG. 3 shows the SMOKE signal ratio of ultrathin Co layer formed on a 9 ML Ag buffer layer on Ge substrate, when the thickness of the Co layer varies from 1.3 to 20 ML. This figure shows that the hysteresis loop of the Co/Ge (111) sample is wider and lower and the Co/Ag/Ge (111) samples present a narrower and higher hysteresis loop. Their magnetic properties are then calculated and analyzed.

Figure 4:
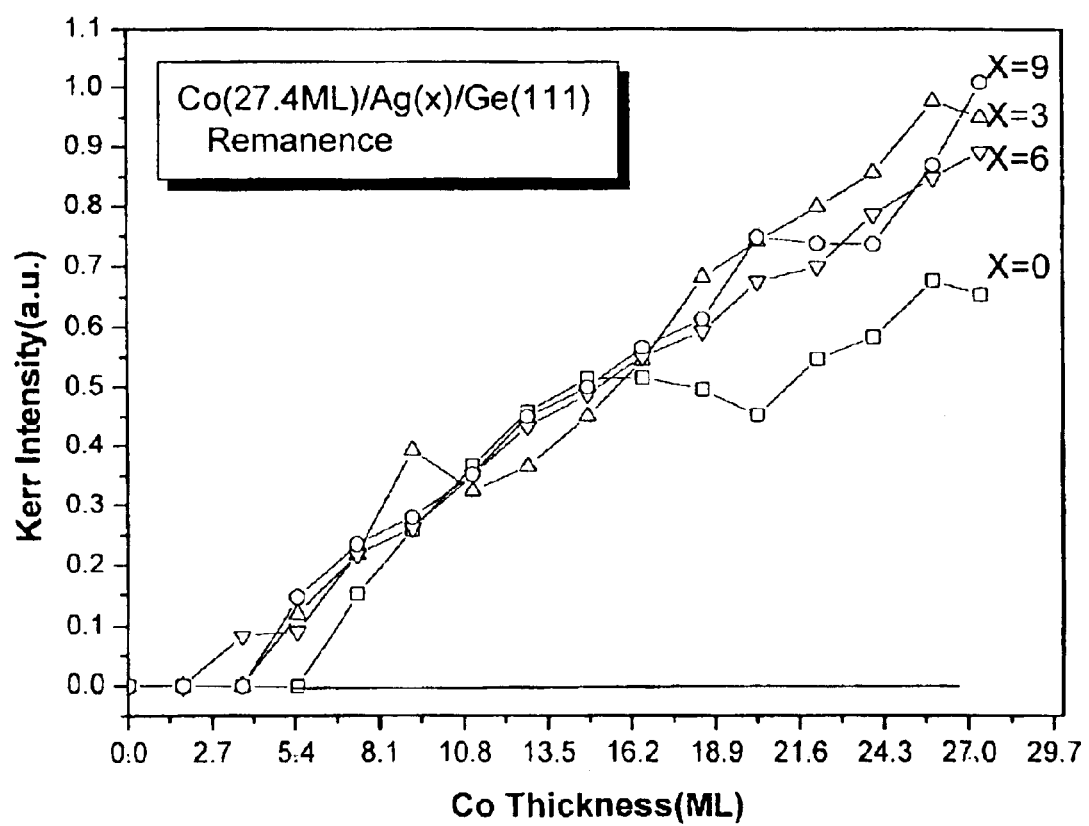
FIG. 4 shows the longitudinal remanence versus thickness of the Co/Ag/Ge (111) samples of this invention and a Co/Ge (111) sample of the prior art, both prepared at 200 K.

FIG. 4 shows the longitudinal remanence versus thickness of the Co/Ag/Ge (111) samples of this invention and a Co/Ge (111) sample of the prior art, both prepared at 200K. From these figures, it is shown that the magnetic structure with an Ag buffer layer exhibits magnetism with thinner Co layer and regression by remanence Kerr signal. The dead-layer thickness of Co/Ag/Ge approach to 0, while the Co/Ge (111) structure has a 0.8 ML deal-layer. This result indicates that the Ag buffer layer is able to separate the combination reaction between Co and Ge effectively.

Figure 5:
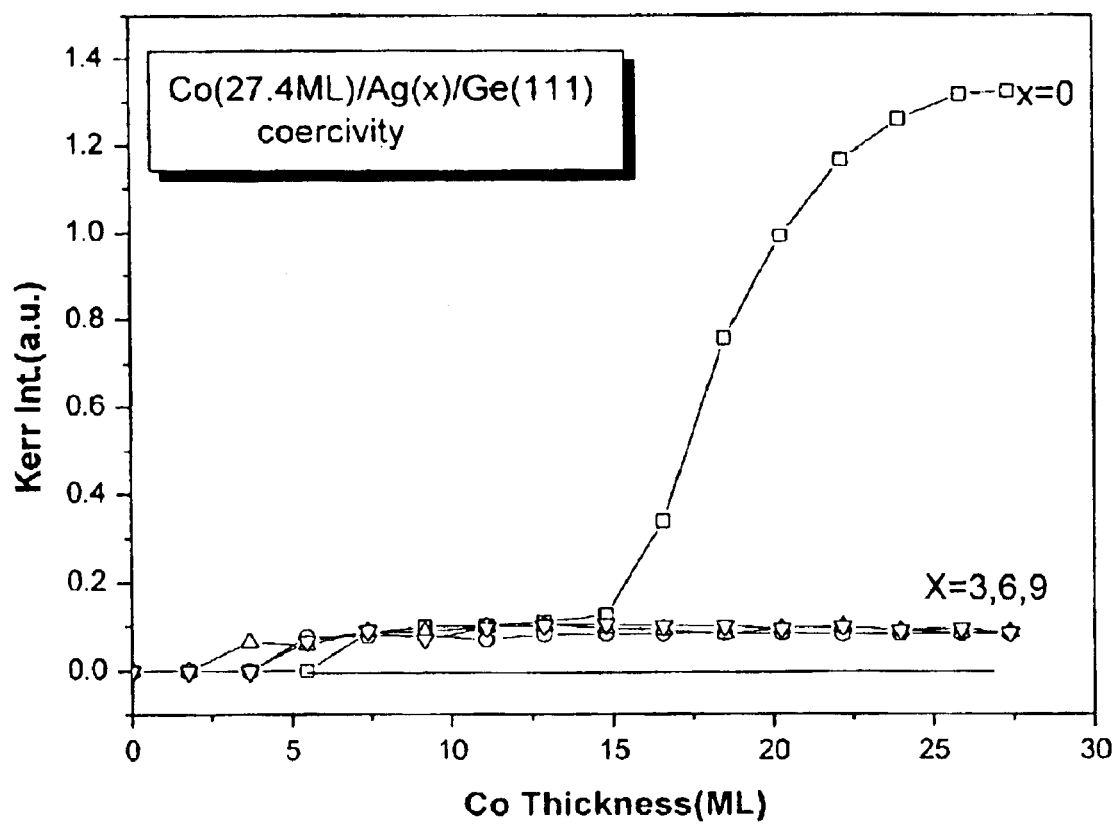
FIG. 5 shows the coercive force versus thickness of Co layer, of the samples of FIG. 4.
Figure 6:
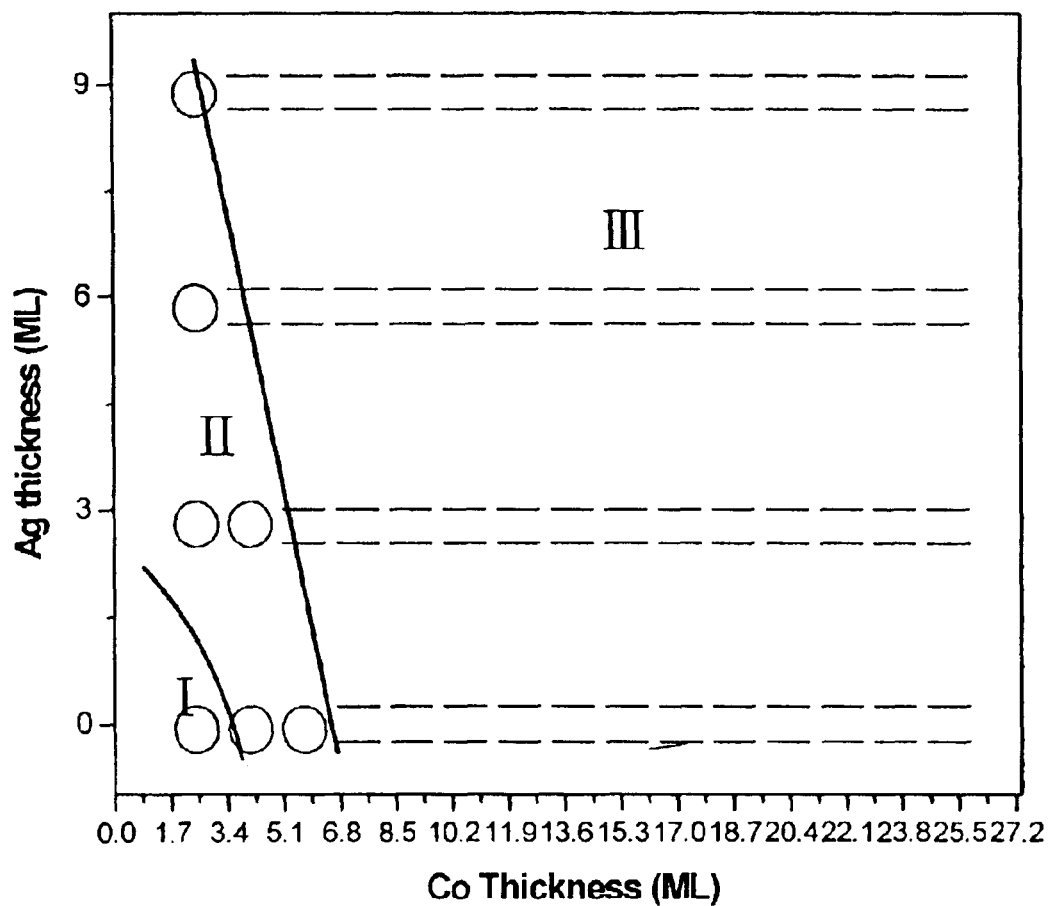
FIG. 6 shows the magnetic phase diagram of Co/Ag/Ge versus thickness of Ag of the samples of FIG. 4.

FIG. 5 shows the coercive force versus thickness of Co layer, of the samples of FIG. 4. As shown in this figure, the Co/Ag/Ge structure of this invention exhibits greater coercive force than that of the Co/Ge structure of the prior art. In other words, the existence of the Ag layer changes the magnetic anisotropy energy of the ultrathin Co layer. FIG. 6 shows the magnetic phase diagram of Co/Ag/Ge versus thickness of Ag of the samples of FIG. 4. In this figure, the rings indicate non-ferromagnetism, the parallel lines indicate the in-plane magnetism and the slant parallel lines indicate the out-of-plane magnetism.

Figure 7:
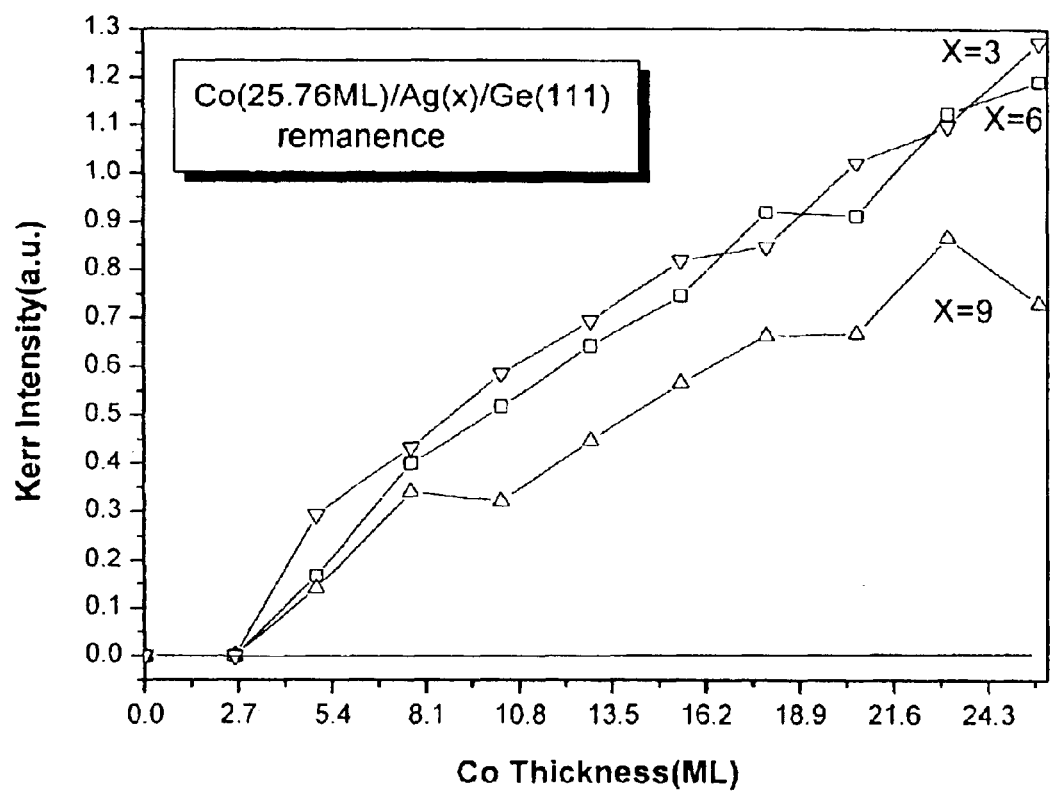
FIG. 7 shows the longitudinal remanence versus thickness of the Co/Ag/Ge (111) samples of this invention and a Co/Ge (111) sample of the prior art, both prepared at 300 K.
Figure 8:
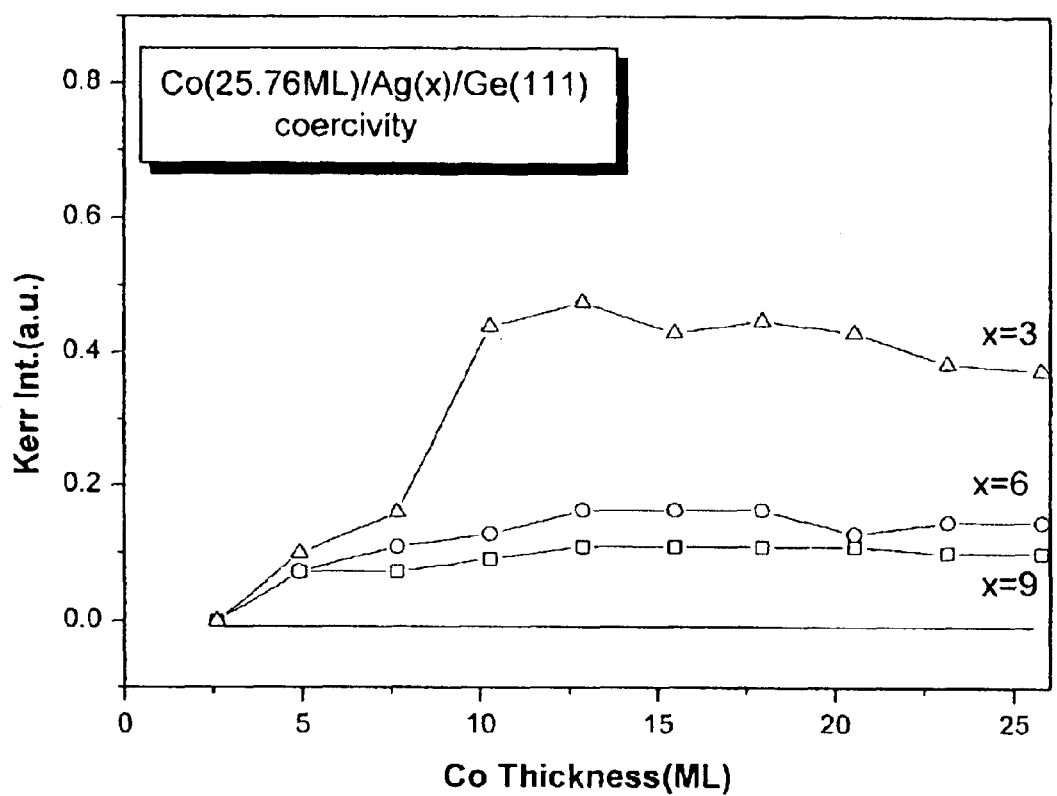
FIG. 8 shows the coercive force versus thickness of Co layer, of the samples of FIG. 7.
Figure 9:
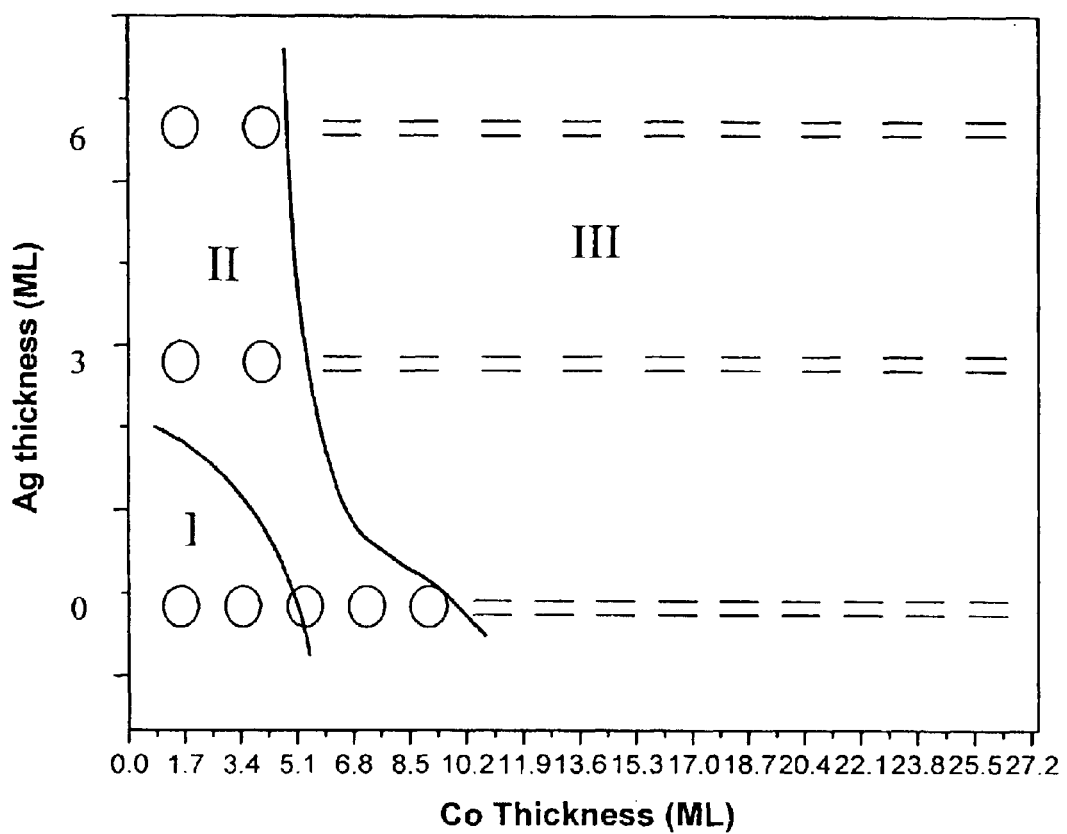
FIG. 9 shows the magnetic phase diagram of Co/Ag/Ge versus thickness of Ag of the samples of FIG. 7.

Now change the temperature in preparing the Co layer to 300K. Prepare samples of Co/Ag/Ge and Co/Ge structures in different Ag layer thickness. The coercive force of the samples is examined. It is found that, due the increase of the thermo vibration among atoms at 300K, a 3 ML thick Ag layer is not able to totally stop the chemical combination of the magnetic material and the substrate under a room temperature and thus a thicker Ag layer is needed. FIG. 7 shows the longitudinal remanence versus thickness of the Co/Ag/Ge (111) samples of this invention and a Co/Ge (111) sample of the prior art, both prepared at 300K. FIG. 8 shows the coercive force versus thickness of Co layer, of the samples of FIG. 7. According to the experimental data, the magnetic phase diagram of the Co/Ag/Ge system of FIGS. 7 and 8 at room temperature is obtained. FIG. 9 shows the magnetic phase diagram of Co/Ag/Ge versus thickness of Ag of the samples of FIG. 7. In this figure, the rings indicate non-ferromagnetism, the parallel lines indicate the in-plane magnetism and the slant parallel lines indicate the out-of-plane magnetism.

As the present invention has been shown and described with reference to preferred embodiments thereof, those skilled in the art will recognize that the above and other changes may be made therein without departing form the spirit and scope of the invention.

What is claimed is:

1. Method for the preparation of an ultrathin magnetic layer on a semiconductor substrate, comprising the steps of:
   prepare a semiconductor substrate;
   prepare a non-ferromagnetic layer on said semiconductor substrate; and
   prepare an ultrathin magnetic layer on said non-ferromagnetic layer;
   characterized in that said non-ferromagnetic layer comprises a non-ferromagnetic metal that is substantially immiscible with material of said magnetic layer under the environment in which said magnetic layer is prepared on said non-ferromagnetic layer.

2. The method according to claim 1 wherein said non-ferromagnetic metal is selected from precious noble metals.

3. The method according to claim 1 wherein said non-ferromagnetic metal is Ag and said magnetic layer comprises Co.

4. The method according to claim 1 wherein said semiconductor substrate comprises Ge or Si substrate.

5. The method according to any one of claims 1–4, wherein thickness of said non-ferromagnetic layer is from 1 to 9 ML.

6. The method according to any one of claims 1–4, wherein thickness of said ultrathin magnetic layer is thicker than 5 ML.

7. A magnetic structure prepared by the method of any one of claims 1–4.

8. A magnetic structure prepared by the method of claim 5.

9. A magnetic structure prepared by the method of claim 6.

* * * * *